April 13, 1926.
F. D. CROSS
AUTOMOBILE DIRECTION INDICATOR
Filed March 22, 1923
1,580,118
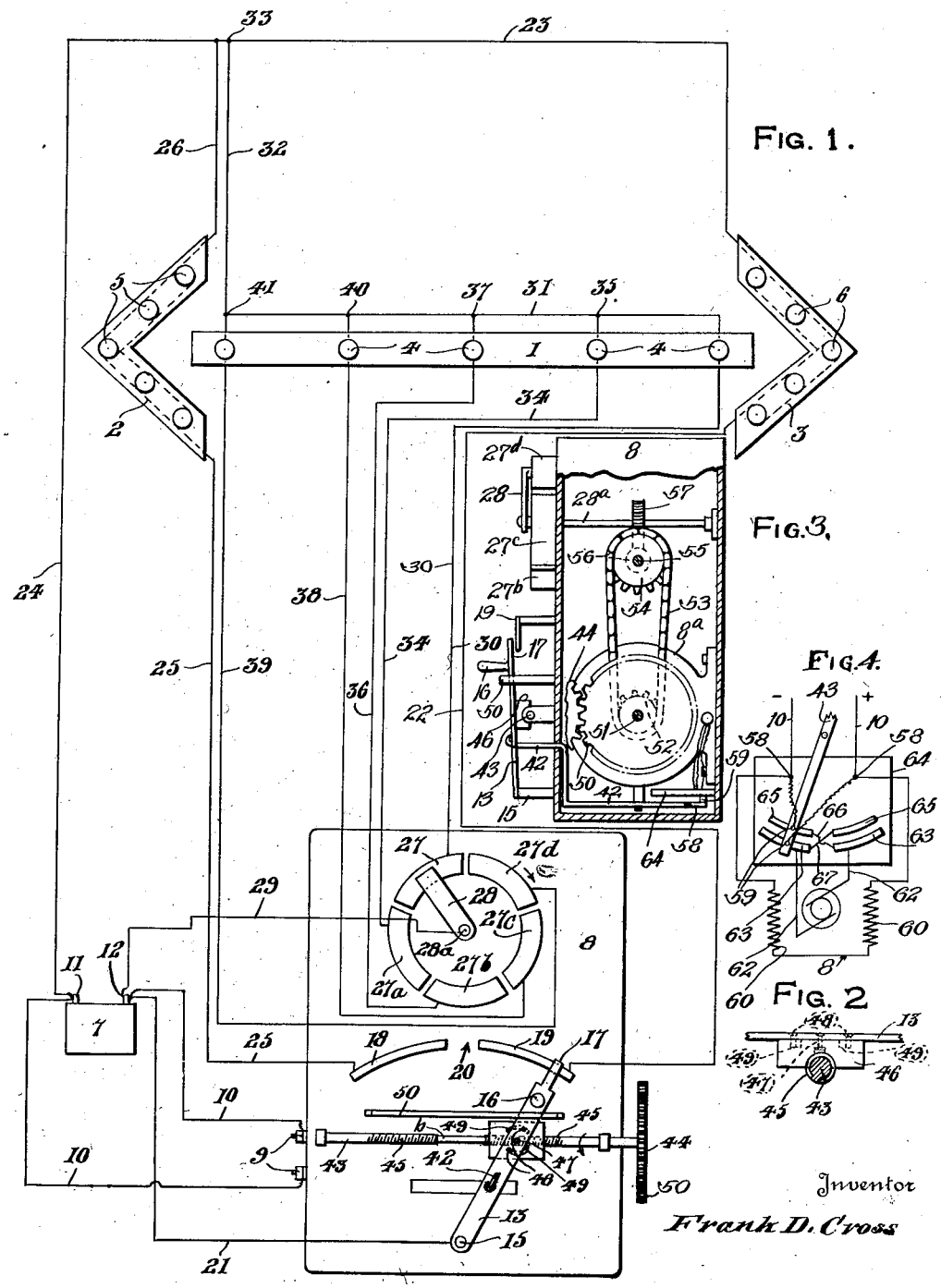

Patented Apr. 13, 1926.

1,580,118

UNITED STATES PATENT OFFICE.

FRANK D. CROSS, OF ELMIRA, NEW YORK.

AUTOMOBILE DIRECTION INDICATOR.

Application filed March 22, 1923. Serial No. 626,840.

*To all whom it may concern:*

Be it known that I, FRANK D. CROSS, a citizen of the United States of America, residing at Elmira, in the county of Chemung and State of New York, have invented certain new and useful Improvements in Automobile Direction Indicators, of which the following is a specification.

The primary object of the present invention resides in the provision of a signal or indicator adapted for mounting adjacent the rear end of a motor vehicle to indicate to operators of other following vehicles, or pedestrians, a contemplated change in the direction of travel of the motor vehicle equipped with the indicator.

Another object of the invention is to provide a signal for motor vehicles to indicate an intended change in the direction of travel, such as either turning to the right or left, the signal being of the illuminated type and of a design embodying a horizontally disposed series of lamps with a separate series of lamps associated with each end of the horizontal series and being in the formation of arrow heads with switch and contact devices electrically connected to the lamp for maintaining illuminated, either of the arrow head shaped series of lamps with the horizontal series of lamps successively illuminated in the direction of the prospective change in direction of travel, causing a flow of light by the successive illumination of the lamps with one of the arrow-head-shaped series constantly illuminated for attracting attention to the signal for strict observance.

With the above and other objects in view as the nature of the invention is better understood, the same consists of the novel form, combination and arrangement of parts hereinafter more fully described, shown in the accompanying drawing and claimed.

In the accompanying drawing there is diagrammatically illustrated in Fig. 1 an automobile direction indicator showing the signal light lamps, the electric wiring therefor and the switch and contact devices for illuminating the lamp, Figure 2 is a detail view showing the screw shaft for automatically shifting the switch control lever to neutral position.

Figure 3 is a detail view, partly in section and partly in elevation, of the motor casing and parts associated therewith, and Figure 4 is a diagrammatic view of the reversible motor and its control.

Briefly described, the present invention embodies a signal casing that is preferably positioned at a point adjacent the rear end of an automobile, the signal casing having an arrow head at each end thereof and a connecting horizontal bar with separate series of lamps supported on the arrow heads and connecting bar. The signal lamps have wire connections with the battery of the automobile, and a motor is interposed in the wire connections having a manually operable controlling switch and a circular series of arcuate contacts with which a rotatable switch arm is associated adapted for the successive illumination of the lamps supported upon the horizontal bar, and the constant illumination of the lamps upon either of the arrow heads.

The accompanying drawing diagrammatically illustrating the invention, in Fig. 1, includes a signal casing housing a horizontal bar 1 with arrow heads 2 and 3 at opposite ends thereof indicating left and right turns respectively, the bar 1 supporting a plurality of spaced lamps 4, the arrow head 2 being provided with a plurality of spaced lamps 5, while the arrow head 3 carries spaced lamps 6.

Wire connections between the several lamps and the battery 7 of the automobile are provided, and in said wire connections a motor casing 8 is interposed, a reversible motor 8ª being housed within the casing 8 and being provided with terminals 9 having wire connections 10 with the poles 11 and 12 of the battery 7. The motor casing 8 is supported on the automobile in a position accessible to the operator, such for instance as upon the instrument board and carries a switch lever 13 pivotally mounted at one end as at 15 and provided with a handle 16 with the free contact end 17 thereof adapted for selective engagement with the spaced arcuate contacts 18 and 19, the switch lever 13 normally occupying the neutral position 20 between adjacent ends of the contacts 18 and 19.

The wire connections between the lamps 5 and 6 of the arrow heads 2 and 3, the arcuate contacts 18 and 19 and the battery 7, include a wire 21 connected to the terminal 12 of the battery 7 and to the pivoted end 15 of the switch lever 13, a wire 22 connected to the contact 19 and connected to the lamps 6 of the arrow head 3, with further wires 23 and 24 for connection with the terminal 11 of the battery. The wire connection for the arrow head 2 includes a wire 25 connected to the arcuate contact 18, and with the lamps 5 in the arrow head 2 and continuing as at 26 for connection with the wire 23, and return through wire 24 to the battery 7. It will therefore be seen that when the outer end 17 of the switch lever 13 contacts either of the arcuate contacts 18 and 19, the lamps in either of the arrow heads 2 or 3 will be illuminated.

The wiring and contacts for successively illuminating the lamps 4 upon the horizontal bar 1 intermediate the arrow heads 2 and 3 includes a circular series of spaced arcuate contacts 27, 27$^a$, 27$^b$, 27$^c$, and 27$^d$, a rotatable contact switch arm 28 successively engaging the contacts 27 to 27$^d$, the rotatable contact arm 28 being reversely rotated by mechanism, to be described in detail at a later point, which is connected to the reversible motor 8$^a$ in the casing 8 when the switch lever 13 engages the respective contacts 18 and 19. A wire 29 is connected to the pivot point 28$^a$ of the contact arm 28 and also to the terminal 12 of the battery 7, the wire 30 extending from the contact 27 to the bar 1 and end lamp 4 adjacent the arrow head 3, continuing therefrom as at 31 and 32 for connection with the wire 23 as at 33, the return current flowing through the wire 24 to the terminal 11 of the battery. The contact 27$^a$ has a wire connection 34 with a lamp upon the bar 1 and is connected as at 35 to the wire 31. A wire 36 connects the contacts 27$^b$ with a lamp upon the bar 1 and is connected as at 37 to the wire 31. Wires 38 and 39 respectively connect the contacts 27$^c$ and 27$^d$ to lamps 4 upon the bar 1 and are further connected as at 40 and 41 to the wire 31.

With the switch lever 13 in its neutral position with the contact end 17 thereof positioned in the space 20 between adjacent ends of the contacts 18 and 19, the signal remains inoperative. The switch lever 13 carries an automatically operating switch lever 42 that renders the reversible motor 8$^a$ within the casing 8 inoperative when the switch lever is in its neutral position. When the automobile turns to the right, for purpose of illustration, the operator shifts the switch lever 13 to the right for engagement with the contact 19, the switch lever 42 being automatically operated to start the motor within the casing 8 through its wire connections 10 with the battery 7 and the switch structure shown in Fig. 4 for rotating the motor in one direction, the motor rotating the contact arm 28 to cause the same to successively contact the several arcuate contact sections 27 to 27$^d$ for successively illuminating the lamps 4 upon the bar 1 to cause a flow of light in the direction of the arrow head 3, the current flowing through the wire connections above described. When the switch lever 13 engages the contact 19, a constant circuit is established through the lamps 6 in the arrow head 3 causing a constant illumination with a flow of light upon the bar 1 in the direction thereof. In turning the automobile to the left, the switch lever 13 is shifted from its neutral position 20 for engagement with the contact 18 causing the current to flow through the lamps 5 in the arrow head 2 with the direction of flow of the light upon the bar 1 likewise reversed.

The movement of the switch lever 13 into contact with either of the segments 18 or 19 is manually accomplished, but the return thereof to the neutral position at 20 is automatically obtained. A shaft 43 is journaled on the motor casing 8 and has a gear connection 44 with the reversible motor to be selectively rotated in opposite directions. The shaft 43 has spaced areas of screw threads 45 formed thereon and separated by the reduced central portion —$b$— of the shaft which are adapted to be selectively engaged by the screw block 46 carried by the switch lever 13 and normally residing in the said reduced portion —$b$—. As clearly illustrated, the block is pivotally mounted on the switch lever 13 at 47 and pins 48 carried by the lever extend into arcuate guide slots 49 formed in the screw block. The switch lever 13 is slightly resilient and in being manually shifted from its neutral point at 20, to move the block 46 out of the reduced portion $b$ for engagement with either of the threaded portions of the shaft 43, the same is moved outwardly, such outward movement being limited by the strap 50. The resiliency of the switch lever 13 moves the block 46 into engagement with the adjacent threaded portion of the shaft, rotation of the shaft shifting the block and switch lever to the neutral position with the desired lamps illuminated as above described.

The motor 8$^a$, previously described as being housed in the casing 8, is provided with a gear 50 mounted on its armature shaft 51 which meshes with the gear 44 carried by the shaft 43 and drives the latter shaft. This armature shaft 51 is further provided with a sprocket wheel 52 which drives the chain 53 riding upon the second sprocket wheel 54 carried by the shaft 55. This shaft 55 carries a worm 56 which meshes with the gear 57 carried by the pivot member 28$^a$. This train of mechanical elements operates the switch arm 28 in unison with the shaft 43.

The motor 8$^a$ is reversed by the mechanism shown in Fig. 4. The switch lever 43 is provided with insulated brushes 59 which are electrically connected to terminals 58 supplied with current by the battery wires 10. The field coils 60 are connected to the terminals 58 while the brushes 61, of the motor 8$^a$, are connected by the wires 62 to the arcuate contacts 63 on the insulating block 64. A second pair of contacts 65 are carried by the insulating block 64 and are arranged in parallelism with the contacts 63. The wires 66 and 67 connect the contacts 63 with the diagonally arranged contacts 65 in the manner best illustrated in Fig. 4. It is now apparent that the pivotal movement of the lever 43 will permit the polarity of the armature circuit to be reversed for causing the armature to rotate in opposite directions.

From the above detail description of the device, it is believed that the construction and operation thereof will at once be apparent, and while there is herein shown and described the preferred embodiment of the present invention, it is nevertheless to be understood that minor changes may be made therein without departing from the spirit and scope of the invention as claimed.

What is claimed as new is:—

1. In a direction signal for motor vehicles, an illuminated signal member including a horizontal series of lamps and an arrowhead having illuminating means located at each end of said series of lamps, a source of electricity, an independent circuit for each of the lamps in the horizontal series and the illuminating means for each of the arrowheads, a switch lever movable in opposite directions to selectively control the flow of electricity through either one of the independent circuits for the arrowhead illuminating means, a reversible motor connected to the source of electricity, means operated by the movement of the switch lever for causing reversible rotation of the motor, a circular series of spaced contacts connected one in each of the independent circuits for the horizontal series of lamps, and a rotatable switch arm driven by the motor and adapted to engage the contacts arranged in a circular series for successively illuminating the lamps in the horizontal series.

2. In a direction signal for motor vehicles, an illuminated signal member including a horizontal series of lamps and an arrowhead having illuminating means located at each end of said series of lamps, a source of electricity, an independent circuit for each of the lamps in the horizontal series and the illuminating means for each of the arrowheads, a switch lever movable in opposite directions to selectively control the flow of electricity through either one of the independent circuits for the arrowhead illuminating means, a reversible motor connected to the source of electricity, means operated by the movement of the switch lever for causing reversible rotation of the motor, means for automatically restoring the switch lever to its inoperative position after the motor has operated for a predetermined interval, and means operated by the motor for successively closing the independent circuits for the horizontal series of lamps.

3. In a direction signal for motor vehicles, an illuminated signal member including a horizontal series of lamps and an arrowhead having illuminating means located at each end of said series of lamps, a source of electricity, an independent circuit for each of the lamps in the horizontal series and the illuminating means for each of the arrowheads, a switch lever movable in opposite directions to selectively control the flow of electricity through either one of the independent circuits for the arrowhead illuminating means, a reversible motor connected to the source of electricity, means operated by the movement of the switch lever for causing reversible rotation of the motor, means for automatically restoring the switch lever to its inoperative position after the motor has operated for a predetermined interval, and means operated by the motor for successively closing the independent circuits for the horizontal series of lamps, the means for restoring the switch lever to its inoperative position including a member caused to travel in opposite directions through a given path by the operation of the motor.

4. In a direction signal for motor vehicles, an illuminated signal member including a horizontal series of lamps and an arrowhead having illuminating means located at each end of said series of lamps, a source of electricity, an independent circuit for each of the lamps in the horizontal series and the illuminating means for each of the arrowheads, a switch lever movable in opposite directions to selectively control the flow of electricity through either one of the independent circuits for the arrowhead illuminating means, a reversible motor connected to the source of electricity, means operated by the movement of the switch lever for causing reversible rotation of the motor, means for automatically restoring the switch lever to its inoperative position after the motor has operated for a predetermined interval, means operated by the motor for successively closing the independent circuits for the horizontal series of lamps, the means for restoring the switch lever to its inoperative position including an element driven in opposite directions by said motor, and a member caused to travel through a given path by said driven element and acting as a connection between said element and switch lever.

5. In a direction signal for motor vehicles, an illuminated signal member including a horizontal series of lamps and an arrowhead having illuminating means located at each end of said series of lamps, a source of electricity, an independent circuit for each of the lamps in the horizontal series and the illuminating means for each of the arrowheads, a switch lever movable in opposite directions to selectively control the flow of electricity through either one of the independent circuits for the arrowhead illuminating means, a reversible motor connected to the source of electricity, means operated by the movement of the switch lever for causing reversible rotation of the motor, means for automatically restoring the switch lever to its inoperative position after the motor has operated for a predetermined interval, means operated by the motor for successively closing the independent circuits for the horizontal series of lamps, the means for restoring the switch lever to its inoperative position including a screw block carried by the switch lever, and a screw shaft reversibly rotated by the motor.

6. In a direction signal for motor vehicles, an illuminated signal member including a horizontal series of lamps and an arrowhead having illuminating means located at each end of said series of lamps, a source of electricity, an independent circuit for each of the lamps in the horizontal series and the illuminating means for each of the arrowheads, a switch lever movable in opposite directions to selectively control the flow of electricity through either one of the independent circuits for the arrowhead illuminating means, a reversible motor connected to the source of electricity, means operated by the movement of the switch lever for causing reversible rotation of the motor, means for automatically restoring the switch lever to its inoperative position after the motor has operated for a predetermined interval, means operated by the motor for successively closing the independent circuits for the horizontal series of lamps, the means for restoring the switch lever to its inoperative position including a screw block carried by the switch lever, a screw shaft reversibly rotated by the motor, said switch lever being resilient to permit disengagement of the block from the shaft, and means for limiting the disengaging movement of the block from the shaft.

In testimony whereof I affix my signature.

FRANK D. CROSS.